United States Patent
Takada et al.

(10) Patent No.: US 10,837,683 B2
(45) Date of Patent: Nov. 17, 2020

(54) THROTTLING DEVICE AND REFRIGERATION CYCLE

(71) Applicant: SAGINOMIYA SEISAKUSHO, INC., Tokyo (JP)

(72) Inventors: Yasumasa Takada, Sayama (JP); Yuichiro Toyama, Sayama (JP); Hiroki Denda, Sayama (JP); Yoshihisa Arai, Sayama (JP); Junichi Yokota, Sayama (JP)

(73) Assignee: SAGINOMIYA SEISAKUSHO, INC., Tokyo (JP)

( * ) Notice: Subject to any disclaimer, the term of this patent is extended or adjusted under 35 U.S.C. 154(b) by 0 days.

(21) Appl. No.: 15/744,389

(22) PCT Filed: Jul. 14, 2016

(86) PCT No.: PCT/JP2016/070859
§ 371 (c)(1),
(2) Date: Jan. 12, 2018

(87) PCT Pub. No.: WO2017/038271
PCT Pub. Date: Mar. 9, 2017

(65) Prior Publication Data
US 2018/0209704 A1    Jul. 26, 2018

(30) Foreign Application Priority Data
Sep. 4, 2015 (JP) .................... 2015-174513

(51) Int. Cl.
F25B 41/06    (2006.01)
F16K 17/30    (2006.01)
(Continued)

(52) U.S. Cl.
CPC .............. *F25B 41/062* (2013.01); *F16K 1/52* (2013.01); *F16K 17/30* (2013.01); *F16K 27/02* (2013.01); *F16K 31/36* (2013.01)

(58) Field of Classification Search
CPC ............ F25B 2341/063; F25B 2600/17; F25B 41/062; F16K 1/52
See application file for complete search history.

(56) References Cited

U.S. PATENT DOCUMENTS 7,487,647 B2    2/2009    Robin et al.
2013/0206851 A1*  8/2013  Sekiguchi ............. F25B 41/062
236/92 B
(Continued)

FOREIGN PATENT DOCUMENTS

JP    S5544150 A    3/1980
JP    2004142701 A    5/2004
(Continued)

OTHER PUBLICATIONS

Written Opinion & International Search Report for PCT/JP2016/070859 dated Sep. 20, 2016, 6 pages.

*Primary Examiner* — Jianying C Atkisson
*Assistant Examiner* — Meraj A Shaikh
(74) *Attorney, Agent, or Firm* — Reising Ethington P.C.

(57) ABSTRACT

A throttling device is equipped with a valve seat in which a valve port for connecting a primary chamber and a secondary chamber is formed, a needle valve, a needle section which is inserted into the valve port, a guide section for guiding a slide shaft of the needle valve, and a coil spring for biasing the needle valve in a valve-closing direction. The guide section and the coil spring are positioned on the primary chamber side. The coil spring is covered by a stopper section. A gap between the stopper section and a (Continued)

main body case functions as a main body path for delivering a refrigerant from the primary chamber to the valve port.

4 Claims, 8 Drawing Sheets

(51) Int. Cl.
    *F16K 31/36*     (2006.01)
    *F16K 1/52*     (2006.01)
    *F16K 27/02*     (2006.01)

(56) References Cited

U.S. PATENT DOCUMENTS

| | | | |
|---|---|---|---|
| 2015/0316155 A1* | 11/2015 | Ishigaki | F16K 3/0218 251/328 |
| 2016/0124441 A1* | 5/2016 | Jukes | F16K 5/0605 137/505 |
| 2018/0136672 A1* | 5/2018 | Nakano | F16K 31/1223 |
| 2018/0202567 A1* | 7/2018 | Takada | F25B 9/002 |
| 2019/0277418 A1* | 9/2019 | Suzuki | F16K 17/30 |

FOREIGN PATENT DOCUMENTS

| | | | |
|---|---|---|---|
| JP | 2006307964 A | 11/2006 | |
| JP | 4664095 B2 | 4/2011 | |

* cited by examiner

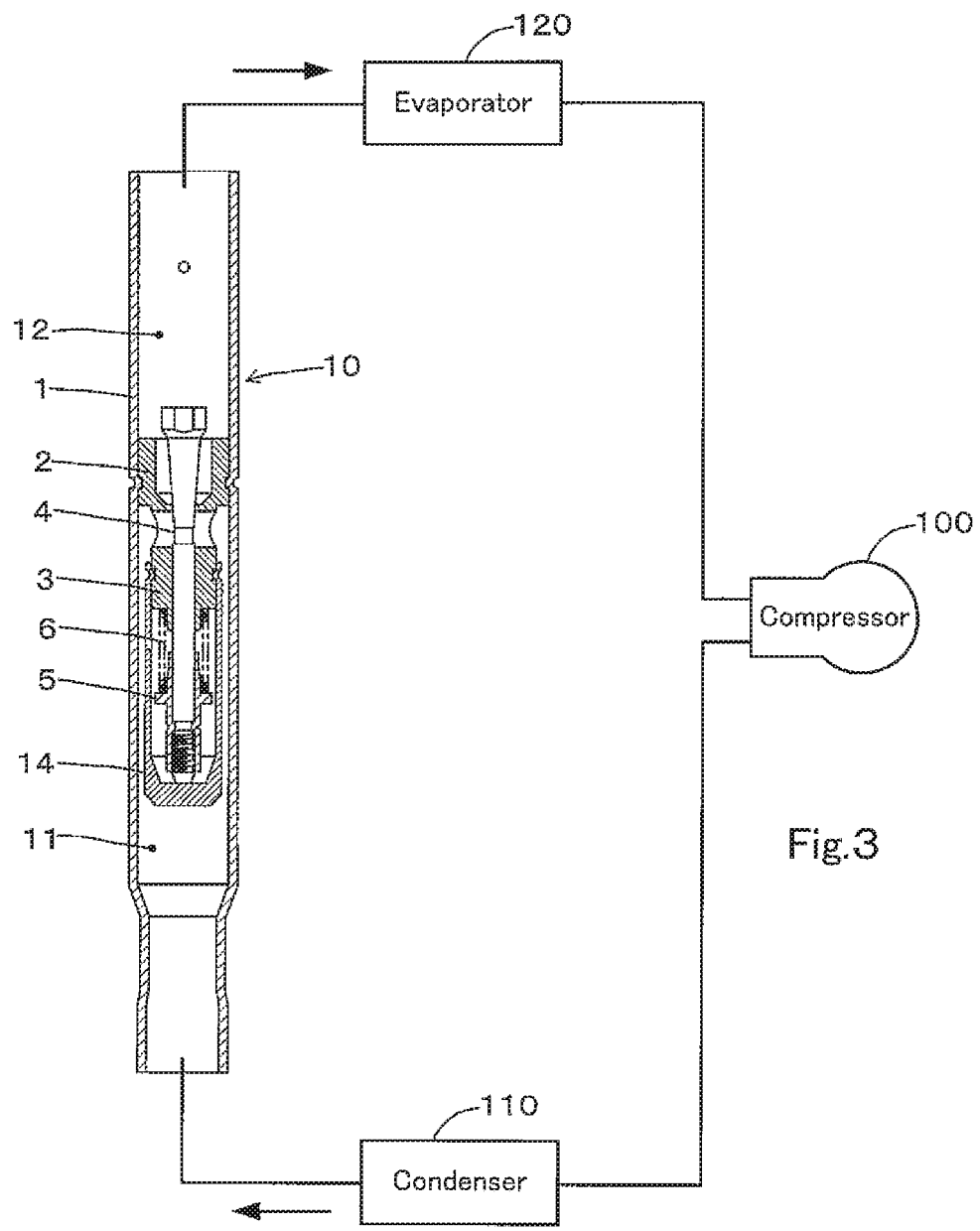

THROTTLING DEVICE AND REFRIGERATION CYCLE

TECHNICAL FIELD

The present invention relates to a throttling device provided in between a condenser and an evaporator in a refrigeration cycle of such as an air conditioner, and the refrigeration cycle.

BACKGROUND ART

Conventionally, such a throttling device is disclosed in, for example, JP 4664095 B (Patent Literature 1).

The above conventional throttling device (expansion valve) is a throttling device in which valve opening degree is varied corresponding to a differential pressure between a refrigerant pressure of a condenser (primary side) and a refrigerant pressure of an evaporator (secondary side) when applied to a refrigeration cycle. This throttling device has a coil spring biasing a valve body in a valve close direction against the differential pressure. Further, the valve-opening degree property is determined corresponding to the differential pressure and a spring constant of the coil spring.

CITATION LIST

Patent Literature

Patent Literature 1: JP 4664095 B

SUMMARY OF INVENTION

Technical Problem

In the throttling device of Patent Literature 1, there is a fear that a foreign particle adhering to the coil spring may prevent the coil spring from being compressed, and a valve open degree depending on the differential pressure may not be obtained. Further, because the coil spring arranged in the primary side of the throttling section is disposed in a flow path of the fluid, there is a problem that a vibration may be generated by the fluid flow.

An object of the present invention is to provide a throttling device able to prevent a foreign particle from adhering to a biasing means such as a coil spring to attain a stable operability, and to prevent a noise from occurring by reducing a vibration of the biasing means due to the fluid flow.

Solution to Problem

According to a first aspect of the present invention, there is provided a throttling device provided in between a condenser and an evaporator in a refrigeration cycle for depressurizing a refrigerant in between a primary chamber connected to the condenser and a secondary chamber connected to the evaporator to feed the refrigerant to the evaporator,
the throttling device including:
a valve seat in which a valve port for communicating between the primary chamber and the secondary chamber is formed;
a valve body for varying a valve opening degree of the valve port by moving along an axial line of the valve port;
a guide section for guiding a sliding shaft of the valve body; and
a biasing means for biasing the valve body in a valve closing direction,
wherein the guide section and the biasing means are arranged in the primary chamber side, and
wherein a cover means covers the biasing means.

According to a second aspect of the present invention, there is provided the throttling device as described in the first aspect,
further including a pressure-equalizing path for communicating an interior of the cover means with the primary chamber.

According to a third aspect of the present invention, there is provided a refrigeration cycle including:
a compressor for compressing a refrigerant as a fluid;
a condenser;
an evaporator; and
the throttling device connected in between the condenser and the evaporator as described in first or second aspect.

Effect of the Invention

According to the first aspect of the present invention, because the cover means covers the biasing means, the biasing means such as a coil spring is prevented from an adhesion of foreign particles, and a stable workability of the biasing means can be attained. Further, a noise is prevented from generating by decreasing a vibration of the biasing means owing to a refrigerant flow.

According to the second aspect of the present invention, because the throttling device further includes a pressure-equalizing path for communicating an interior of the cover means with the primary chamber, even if the pressure of the primary chamber is rapidly changed, because the interior of the cover means is also changed, regardless of a speed of the pressure change, the valve open degree depending on the differential pressure can be attained.

According to the third aspect of the present invention, similar to the effect of the first or second aspect can be attained.

BRIEF DESCRIPTION OF DRAWINGS

FIG. 3 is a schematic view of a refrigeration cycle according to an embodiment.

DESCRIPTION OF EMBODIMENT

Figure 1:
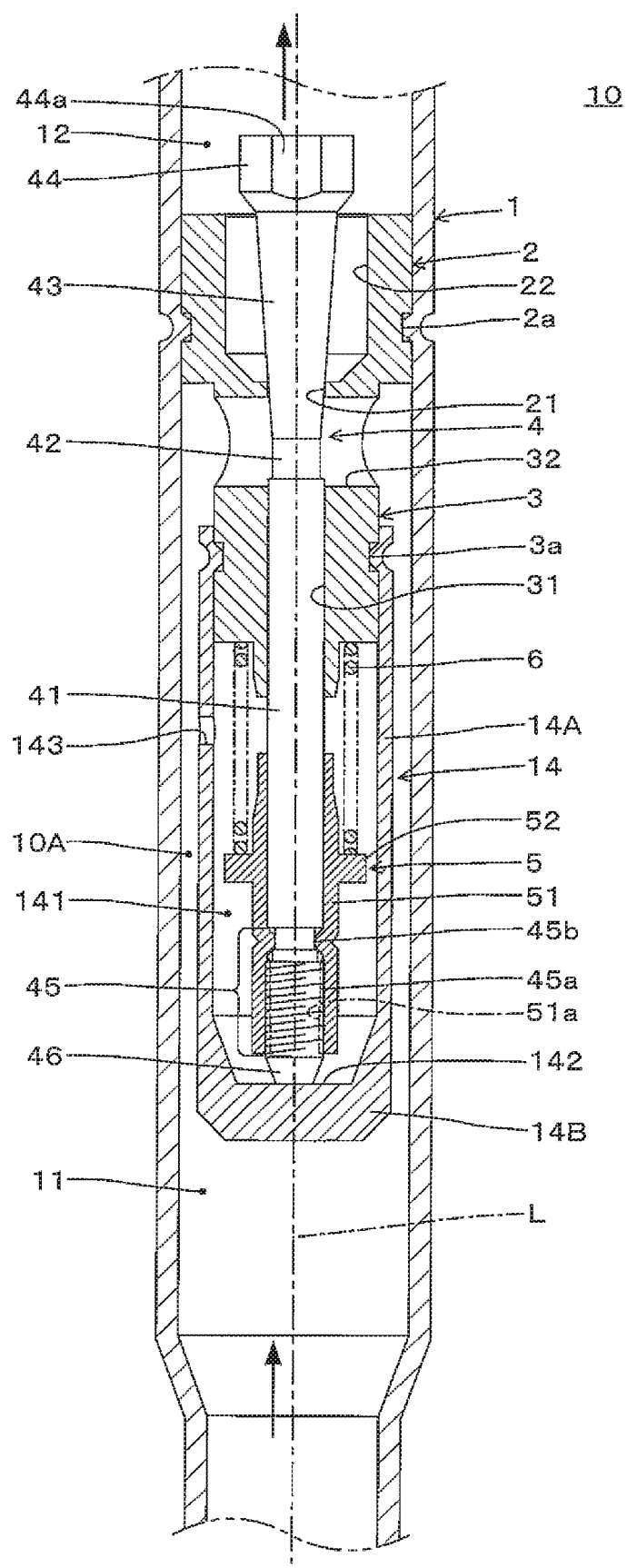
FIG. 1 is a vertical sectional view showing a valve close state of a throttling device according to a first embodiment of the present invention.

Next, a throttling device according to an embodiment of the present invention will be described with reference to drawings. FIG. 1 is a vertical sectional view showing a valve close state of a throttling device according to a first embodiment of the present invention, FIG. 2 is a vertical sectional view showing a valve open state of the throttling device according to the first embodiment, and FIG. 3 is a schematic view of a refrigeration cycle according to an embodiment.

First, the refrigeration cycle of FIG. 3 will be described. Incidentally, in FIG. 3, only main components of a throttling device 10 are denoted by reference signs. This refrigeration cycle has a compressor 100, a condenser 110, the throttling device of the embodiment, and an evaporator 120. The refrigerant compressed by the compressor 100 is supplied to the condenser 110, and the refrigerant cooled down by this condenser 110 is fed to the throttling device 10. The throttling device 10 expands and depresses the refrigerant as later described, and feeds to the evaporator 120. Then, a room interior is cooled down by this evaporator 120 to attain a cooling function. The refrigerant evaporated by the evaporator 120 is circulated to the compressor 100. Incidentally, FIG. 3 shows the throttling device 10 of the first embodiment, however, the throttling devices 10 of the later described embodiments and variations similarly constitute the refrigeration cycle.

Figure 2:
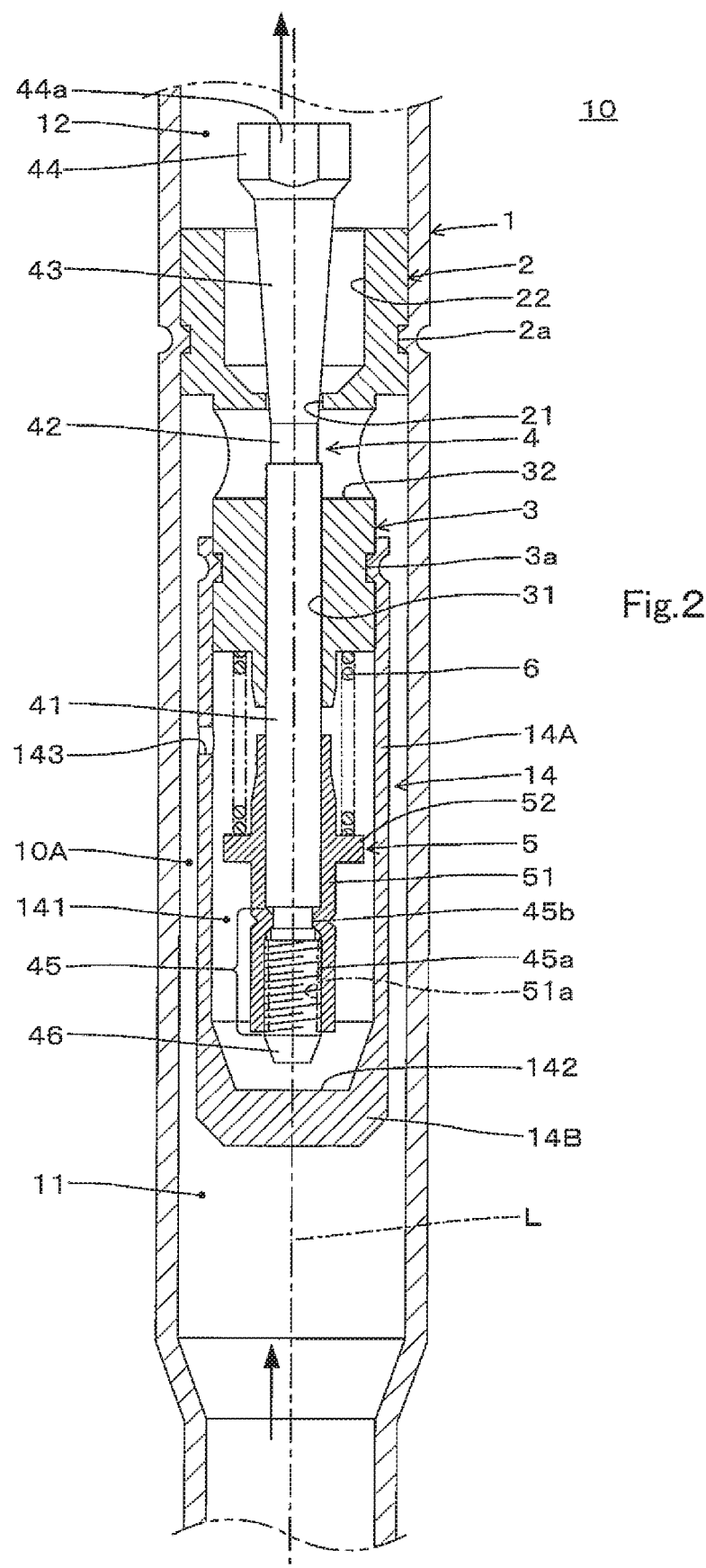
FIG. 2 is a vertical sectional view showing a valve open state of the throttling device according to the first embodiment.

As shown in FIGS. 1 and 2, the throttling device 10 includes: a main body case 1 made of a metal tube such as a copper tube; a valve seat section 2; a guide section 3; a needle valve 4 as "valve body"; a spring receiver 5 as "receiving member"; a coil spring as "biasing means"; and a stopper section 14 as "cover means". Incidentally, the valve seat section 2 and the guide section 3 are integrally formed by cutting metallic material or the like.

The main body case 1 has a cylinder shape centering on an axis line L, and constitute a primary chamber 11 connected to the condenser 110 and a secondary chamber 12 connected to the evaporator 120. The valve seat section 2 has a substantially columnar shape matching with an inner face of the main body case 1. A swaging groove 2a is formed on an outer periphery of the valve seat section 2. By swaging the main body case 1 at a position of the swaging groove 2a, the valve seat section 2 (and the guide section 3) is fixed to an interior of the main body case 1.

Further, a circular valve port 21 centering on the axis line L is formed on the valve seat section 2, and an open hole 22 opening from the valve port 21 to the secondary chamber 12 side is formed on the valve seat section 2. The guide section 3 is extended vertically from the valve seat section 2 to an interior of the primary chamber 11. A cylinder-shaped guide hole 31 centering on the axial line L and a cave 32 communicating the valve port 21 with the primary chamber 11 are formed on the guide section 3.

The needle valve 4 includes: a columnar-shaped slide shaft 41 inserted into an interior of the guide hole 31 of the guide section 3; a columnar-shaped small diameter section 42 of which diameter is smaller than the slide shaft 41; a conically-shaped needle section 43 of which diameter is gradually increased with its extension from the small diameter section 42 toward the secondary chamber 12 side; a boss section 44 formed at an end of the needle section 43 at the secondary chamber 12 side; a fixation section 45 formed on the slide shaft 41 at the stopper section 14 side; and a truncated conically-shaped abutment section 46 of which diameter is gradually decreased as its extension from the fixation section 45 toward the stopper section 14 side. a D-cut face 44a is formed at one point on an outer periphery of the boss section 44. Further, a male thread section 45a is formed on an outer periphery of the fixation section 45, and a swaging groove 45a is formed on an end of the fixation section 45 at the slide shaft 41 side.

The spring receiver 5 has a cylinder-shaped tube section 51 for fitting with the needle valve 4, and a flange section 52 formed on an outer periphery of the tube section 51. A female thread section 51a for screwing with the male thread section 45a of the fixation section 45 is formed on an inner periphery of the tube section 51 at the stopper section 14 side. This spring receiver 5 is attached to the needle valve 4 by fitting the tube section 51 with the needle valve 4 and by screwing the female thread section 51a with the male thread section 45a of the fixation section 45. The attachment position with respect to the needle valve 4 is adjusted by a screwing amount of the female thread section 51a with respect to the male thread section 45a. Then, by swaging the tube section 51 at the position of the swaging groove 45b, the spring receiver 5 is fixed to the needle valve 4. The coil spring 6 is arranged in between the guide section 3 and the flange section 52 of the spring receiver 5 in a compressed manner. Thereby, the coil spring 6 biases the needle valve 4 in a valve close direction.

A stopper section 14 has a bottomed cylinder shape composed of a cylinder section 14A and a bottom section 14B to form a columnar stopper chamber 141. The cylinder section 14A is fitted with an outer periphery of the guide section 3. A swaging groove 3a is formed on an outer periphery of the guide section 3. By swaging the cylinder section 14A at a position of the swaging groove 3a, the stopper section 14 is fixed to the guide section 3. Thereby, the spring receiver 5, the coil spring 6, a part of the slide shaft 41 of the needle valve 4, the fixation section 45, and the abutment section 46 are arranged in an interior of the stopper chamber 141. Further, a gap between the stopper section 14 and the main body case 1 is a main body path 10A for feeding the refrigerant from the primary chamber 11 to the valve port 21. A face of the bottom section 14B at the stopper chamber 141 side is a stopper face 142 on which the abutment section 46 of the needle valve 4 abuts. By the abutment section 46 of the needle valve 4 abutting on the stopper face 142, a position of the needle valve 4 in the axial line L direction is regulated. Further, a pressure-equalizing hole 143 as "pressure-equalizing path" communicating the stopper chamber 141 with the primary chamber 11 is formed on the cylinder section 14A.

According to the above configurations, the high-pressure refrigerant from the condenser 110 flows into the primary chamber 11. This refrigerant in the primary chamber 11 flows from the cave 32 of the guide section 3 through a gap between the valve port 21 and the needle section 43 to the open hole 22, and flows out to the secondary chamber 12. In the valve close state in FIG. 1, an end face of the abutment section 46 of the needle valve 4 abuts on the stopper face 142 of the stopper section 14, and the needle valve 4 is not seated on the valve seat section 2. This gap between the needle section 43 and the valve port 21 works as "orifice" for throttling the flow of the refrigerant from the primary chamber 11 to the secondary chamber 12 and for expanding and depressing the refrigerant. Then, a force generated by the differential pressure between the refrigerant pressure in the primary chamber 11 and the refrigerant pressure in the secondary chamber 12 acts on the needle valve 4 in the valve open direction. When the pressure in the primary chamber 11 is increased, the needle valve 4 is in the valve open state shown in FIG. 2. The balance between the force generated by the differential pressure and the biasing force of the coil spring 6 defines the position of the needle valve, namely, the valve open degree of the valve port 21.

Here, the refrigerant expanded in the valve port 21 becomes a gas-liquid mixing state in the secondary chamber 12 side, and in the primary chamber 11 side, the refrigerant is a liquid state of the relatively slow-moving liquid refrigerant. The needle valve 4 is guided along the axial line L by inserting the slide shaft 41 into the guide hole 31 of the guide section 3, and this guide section 3 is arranged in the primary chamber 11 side.

Further, the coil spring 6 and the spring receiver 5 are also arranged in the primary chamber 11 side, and the stopper section 14 covers the coil spring 6 together with a part of the slide shaft 41 and a part of the guide hole 31. Therefore, the coil spring 6 is prevented from the adhesion of the foreign particle, and a stable operability is attained until the coil spring 6 is compressed most. Further, the noise generated by the vibration of the coil spring 6 owing to the refrigerant flow is further prevented. Further, the refrigerant's effect on the slide movement between the guide hole 31 and the slide shaft 41 is reduced, and a stable operation of the needle valve 4 is ensured.

In this embodiment, the position of the needle section 43 in the axial line L direction before the valve open degree is increased is positioned by the stopper section 14. Namely, the minimum gap between the valve port 21 and the needle valve 4 as the initial valve open degree defining the bleed flow rate is defined by the setting positions of the stopper section 14, the needle valve 4, and the valve seat 2.

Because the needle valve 4 is prevented from seating on the valve seat section 2 by the stopper section 14, the needle section 43 does not bite into the valve port 21 due to the biasing force of the coil spring 6 or the like. Further, because the minimum gap (orifice) between the needle section 43 and the valve port 21 is secured by the stopper section 14, if the gap is clogged with the foreign particle, the foreign particle can be ejected by an open operation of the needle valve 4. Namely, in a configuration that a bleed port such as a small hole is provided around the valve port or the needle section 43, there is a possibility that the foreign particle is maintained in the clogging state, however, there is no possibility in this embodiment.

Further, the abutment section 46 of the needle valve 4 has a truncated conical shape, and a diameter of an abutting face abutting on the stopper face 142 of the stopper section 14 is smaller than an outer diameter of the slide shaft 41. Thereby, even if there is a slight inclination from the axial line L caused by variations of shapes of components or the like, namely, even if there is a slight variation in accuracy of a right angle of the needle valve 4 relative to the stopper face 142, a position change of the needle valve 4 in the axial line L direction becomes small. Therefore, in particular, even if the needle valve 4 is rotated from an initial assembled state, an initial bleed area defining the initial valve open degree will not be changed, and a stable bleed flow rate can be attained. In particular, like this embodiment, this is effective in a case that a distance from the valve port 21 to the stopper face 142 is long by arranging the guide section 3, the coil spring 6, and the coil receiver 5 in the primary chamber 11 side.

Incidentally, in this embodiment, the boss section 44 of the needle valve 4 positioned at the primary chamber 12 side has a non-rotationally symmetric shape by having the D-cut face 44a. Thereby, the force of the refrigerant passing through the valve port 21 acts unsymmetrically on the needle valve 4 at both sides of the axial line L to prevent the needle valve 4 from vibration.

Further, because the stopper section 14 is fixed to the guide section 3, if the main body case 1 is deformed due to a twist of the pipe arrangement or the like, the position relationship between the stopper face 142 of the stopper section 14 and the abutment section 46 of the needle valve will not be sifted, and the performance can be maintained.

Further, because the pressure-equalizing hole 143 is formed on the stopper section 14, if the pressure in the primary chamber 11 is rapidly changed, the pressure in an interior of the stopper chamber 141 will be also changed following this pressure change. Therefore, regardless of a speed of the pressure change, the valve open degree depending on the differential pressure can be attained.

Figure 4A:
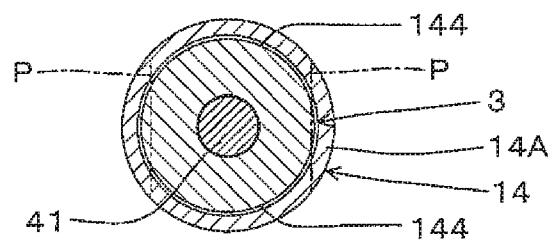
FIG. 4A is a sectional view taken on line A-A of FIG. 6B.
Figure 4B:
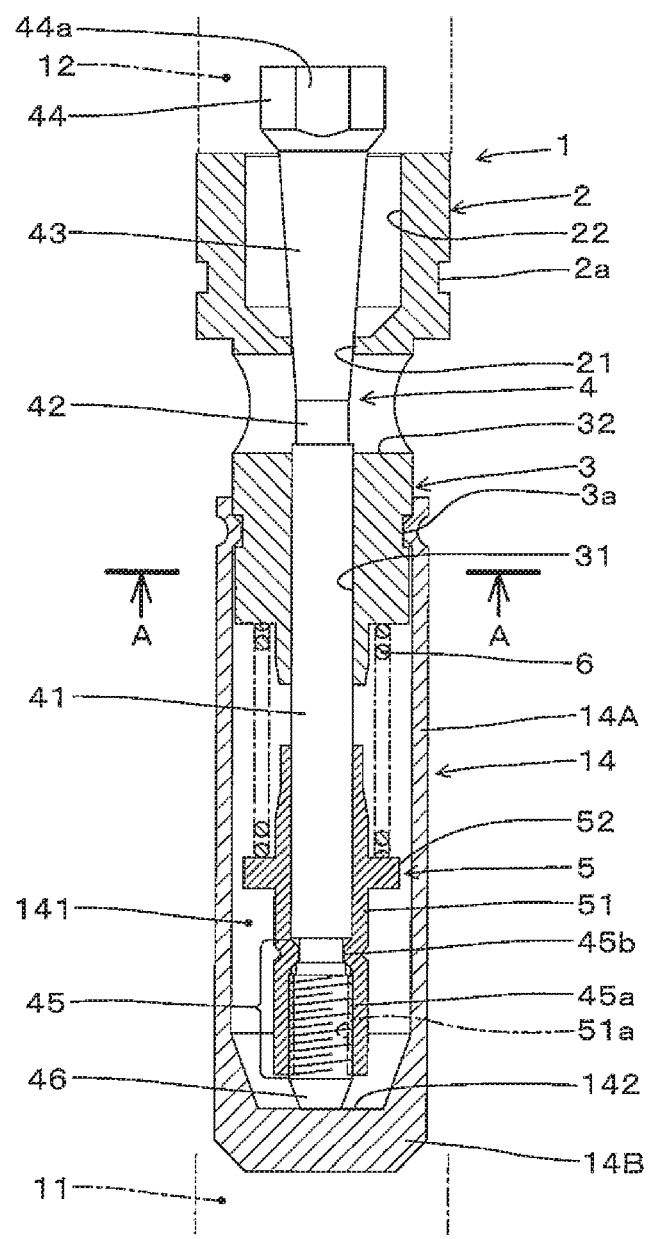
FIG. 4B is a vertical sectional view showing a first variation of the first embodiment.
Figure 5A:
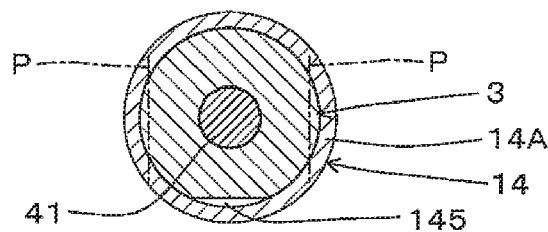
FIG. 5A is a sectional view taken on line B-B of FIG. 7B.
Figure 5B:
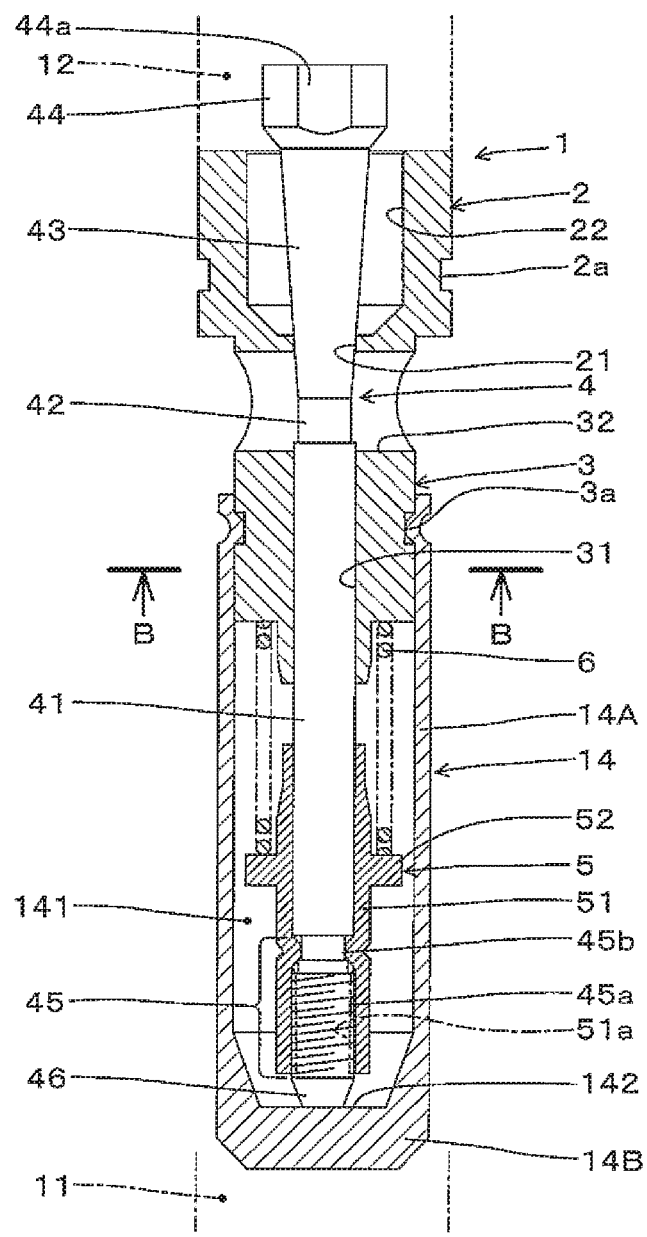
FIG. 5B is a vertical sectional view showing a second variation of the first embodiment.

FIGS. 4A and 4B show a first variation of the first embodiment, FIGS. 5A and 5B show a second variation of the first embodiment, and an illustration of the main body case 1 is omitted. FIG. 4A is a sectional view taken on line A-A of FIG. 4B, and FIG. 5A is a sectional view taken on line B-B of FIG. 5B.

In the first variation shown in FIGS. 4A and 4B, a gap 144 as "pressure-equalizing path" is provided in between the guide section 3 and the cylinder section 14A of the stopper section 14. Incidentally, as indicated by a chain line P in FIG. 4A, swaging portions of the cylinder section 14A for fixing the stopper section 14 to the guide section 3 are only at both sides partially. Thereby, similar to the pressure-equalizing hole 143 of the second embodiment, the gap 144 allows the presser in an interior of the stopper chamber 141 to follow the pressure change in the primary chamber 11. Therefore, regardless of a speed of the pressure change, the valve open degree depending on the differential pressure can be attained.

In the second variation shown in FIGS. 5A and 5B, a gap 145 as "pressure-equalizing path" is provided in between the guide section 3 and the cylinder section 14A of the stopper section 14 by forming a D-cut face on a part of a side face of the guide section 3. In this case also, as indicated by a chain line P in FIG. 5A, swaging portions of the cylinder section 14A for fixing the stopper section 14 to the guide section 3 are only at both sides partially. Thereby, similar to the pressure-equalizing hole 143 of the second embodiment, the gap 145 allows the presser in an interior of the stopper chamber 141 to follow the pressure change in the primary chamber 11. Therefore, regardless of a speed of the pressure change, the valve open degree depending on the differential pressure can be attained.

Figure 6:
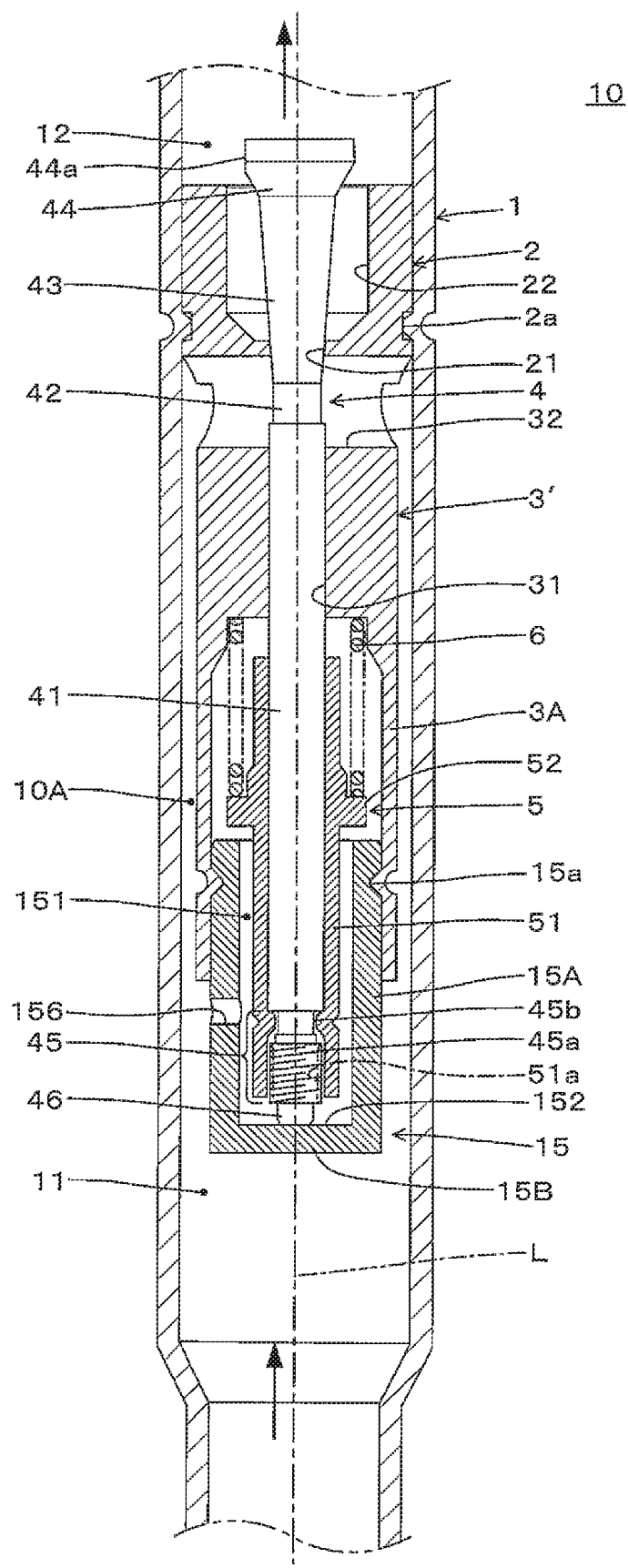
FIG. 6 is a vertical sectional view showing a valve close state of a throttling device according to a second embodiment of the present invention.

FIG. 6 is a vertical sectional view showing a valve close state of a throttling device according to a second embodiment of the present invention. In this second embodiment, a great difference from the first embodiment is configurations of the guide section and the stopper section. Hereinafter, in the embodiments and the variations, the components same as or corresponding to the first embodiment are denoted by the same reference signs. These components denoted by the same reference signs have the similar structures and similar effects, and the overlapping explanations are properly omitted.

A guide section 3' of this second embodiment has a cylindrical sleeve 3A as "cover means" extending to an interior of the primary chamber 11. Further, a stopper section 15 forms a columnar-shaped stopper chamber 151 by a cylinder section 15A and a bottom section 15B. Further, a face of the bottom section 15B at the stopper chamber 151 side is a stopper face 152 on which the abutment section 46 of the needle valve 4 abuts. The cylinder section 15A has a swaging groove 15a, and by swaging the sleeve 3A at a position of the swaging groove 15a, the stopper section 15 is fixed to the guide section 3'. Similar to the first embodiment, the stopper section 15 has the stopper chamber 151, and the spring receiver 5, the coil spring 6, a part of the slide shaft 41 of the needle valve 4, the fixation section 45, and the abutment section 46 are arranged in an interior of the stopper chamber 151. A gap between the sleeve 3A and the main body case 1 functions as a main body path 10A for delivering the refrigerant from the primary chamber 11 to the valve port 21. Further, a pressure-equalizing hole 156 as "pressure-equalizing path" communicating the stopper chamber 151 with the primary chamber 11 is formed on the cylinder section 15A.

In this second embodiment, because the sleeve 3A of the guide section 3 covers the coil spring 6, similar to the first embodiment, the coil spring 6 is prevented from the adhesion of the foreign particle, and a stable operability is attained. Further, the noise generated by the vibration of the coil spring 6 owing to the refrigerant flow is further prevented. Further, owing to the pressure-equalizing hole 156, with respect to the pressure rapid change in the primary chamber 11, the valve open degree depending on the differential pressure can be attained.

Further, in this second embodiment also, because the needle valve 4 is prevented from seating on the valve seat section 2 by the stopper section 15, the needle section 43 does not bite into the valve port 21. Further, similar to the first embodiment, if the gap is clogged with the foreign particle, the foreign particle can be ejected by an open operation of the needle valve 4.

Figure 7:
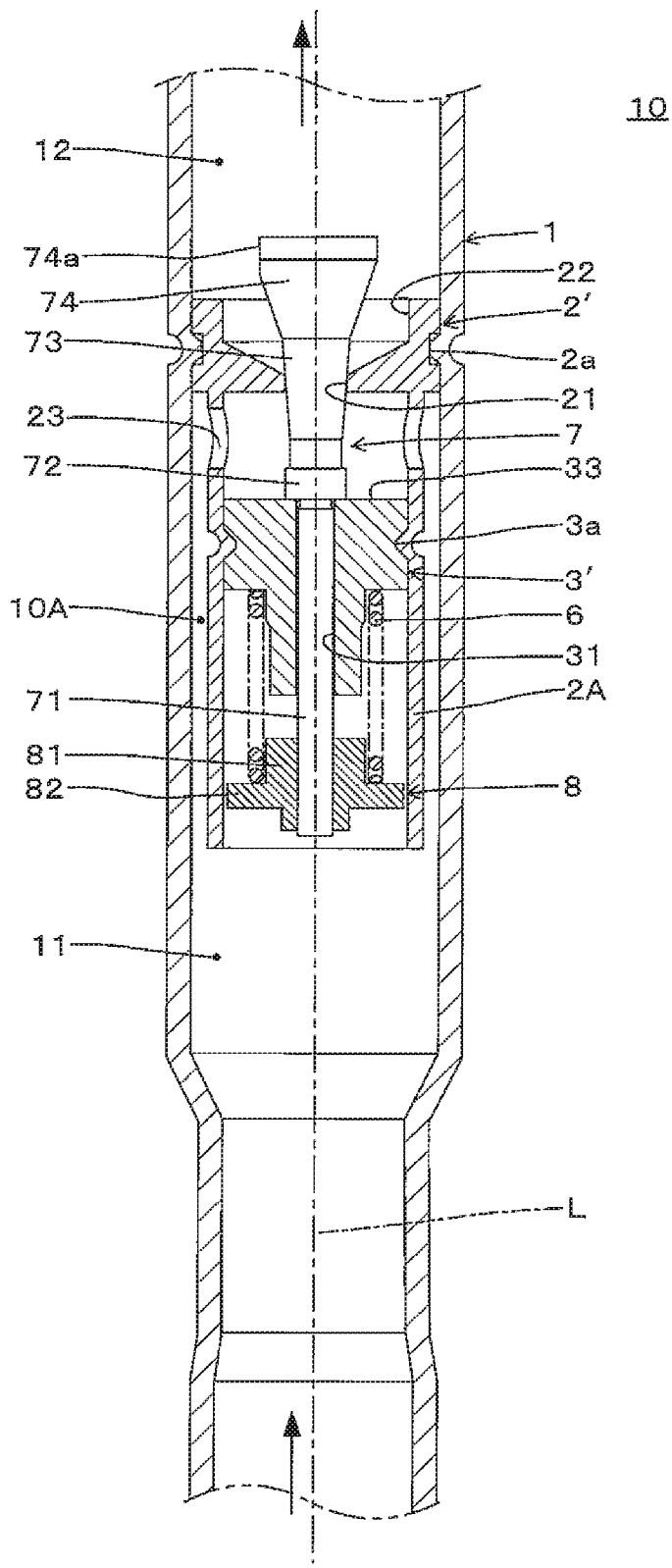
FIG. 7 is a vertical sectional view showing a valve close state of a throttling device according to a third embodiment of the present invention.

FIG. 7 is a vertical sectional view showing a valve close state of a throttling device according to a third embodiment of the present invention. In this third embodiment, a valve seat section 2' and a guide section 3' are made of independent members. Further, the stopper section is composed of a needle valve 7 and the guide section 3'.

The valve seat section 2' has a cylinder-shaped sleeve 2A as "cover member" extending to an interior of the primary chamber 11. The guide section 3' is arranged in the sleeve 2A, and by swaging the sleeve 2A at a position of the swaging groove 3*a* on an outer periphery of the guide section 3', the guide section 3' is fixed to the valve seat section 2' (sleeve 2A). Further, a gap between the sleeve 2A and the main body case 1 is a main body path 10A for feeding the refrigerant from the primary chamber 11 to the valve port 21. A cave 23 communicating the valve port 21 with the primary chamber 11 is formed on the sleeve 2A, and a cylinder-shaped guide hole 31 centering on the axial line L is formed on the guide section 3'.

The needle valve 7 includes: a columnar-shaped slide shaft 71 inserted into an interior of the guide hole 31 of the guide section 3'; a columnar-shaped large diameter section 72 of which diameter is larger than the slide shaft 71; a conically-shaped needle section 73 of which diameter is gradually increased with its extension from the large diameter section 72 toward the secondary chamber 12 side; and a boss section 74 formed at an end of the needle section 73 at the secondary chamber 12 side. A D-cut face 74*a* is formed at one point on an outer periphery of the boss section 74.

The boss section 81 of the spring receiver 8 is fitted and fixed to an end of the slide shaft 71 of the needle valve 7. Further, the spring receiver 8 has a flange section 82 formed on an outer periphery of the boss section 81. Then, the coil spring 6 is arranged in between the guide section 3' and the flange section 82 of the spring receiver 8 in a compressed manner. Thereby, the coil spring 6 biases the needle valve 7 in a valve close direction. Thereby, the spring receiver 8, the coil spring 6, and a part of the slide shaft 71 of the needle valve 7 are arranged in the sleeve 2A.

Incidentally, a face of the guide section 3' at the valve port 21 side is a stopper face 33, and the large diameter section 72 of the needle valve 7 abuts on this stopper face 33 to regulate the position of the needle valve 7 in the axils line L direction.

In this third embodiment, because the sleeve 2A and the spring receiver 8 cover the coil spring 6, similar to the first embodiment, the coil spring 6 is prevented from the adhesion of the foreign particle, and a stable operability is attained. Further, the noise generated by the vibration of the coil spring 6 owing to the refrigerant flow is further prevented.

In this third embodiment also, because the needle valve 4 is prevented from seating on the valve seat section 2 by the large diameter section 72 of the needle valve 7 and the stopper face 33 of the guide section 3', the needle section 73 does not bite into the valve port 21. Further, similar to the first embodiment, if the gap is clogged with the foreign particle, the foreign particle can be ejected by an open operation of the needle valve 7.

Figure 8:
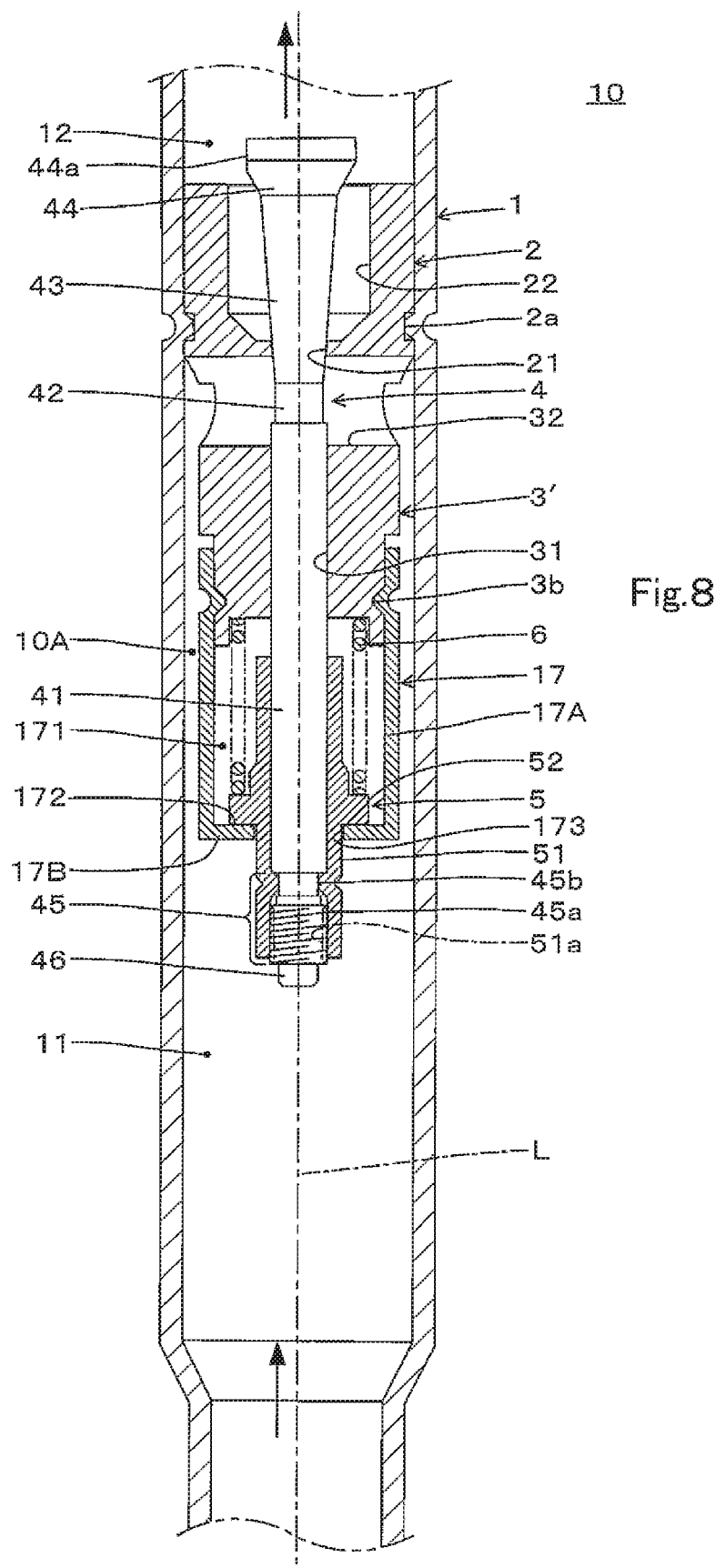
FIG. 8 is a vertical sectional view showing a valve close state of a throttling device according to a fourth embodiment of the present invention.

FIG. 8 is a vertical sectional view showing a valve close state of a throttling device according to a fourth embodiment of the present invention. In this fourth embodiment, a great difference from the second embodiment is a configuration of the stopper section. In a stopper section 17 as "cover means" according to the fourth embodiment, a cylinder section 17A and a bottom section 17B form a cylinder-shaped stopper chamber 171. Further, a conduction hole 173 is formed at the center of the bottom section 17B. Then, by swaging the cylinder section 17A at a position of a swaging groove 3*b* of the guide section 3', the stopper section 17 is fixed to the guide section 3'. Further, a gap between the stopper section 17 and the main body case 1 is a main body path 10A for feeding the refrigerant from the primary chamber 11 to the valve port 21. Further, in this fourth embodiment, the conduction hole 173 is formed on the bottom section 17B, and the tube section 51 of the spring receiver 5 is inserted into the conduction hole 173. Then, a face of the bottom section 17B at the stopper chamber 171 side is a stopper face 172 on which the flange section 52 of the spring receiver 5 abuts. Thereby, a position of the needle valve 4 in the axial line L direction is regulated.

In this fourth embodiment also, because the stopper section 17 covers the coil spring 6, similar to the first embodiment, the coil spring 6 is prevented from the adhesion of the foreign particle, and a stable operability is attained. Further, the noise generated by the vibration of the coil spring 6 owing to the refrigerant flow is further prevented.

Further, in this fourth embodiment also, because the needle valve 4 is prevented from seating on the valve seat section 2 by the stopper section 17, the needle section 43 does not bite into the valve port 21. Further, similar to the first embodiment, if the gap is clogged with the foreign particle, the foreign particle can be ejected by an open operation of the needle valve 4.

In the above embodiments, an example that the valve body is a needle valve is described. However, the present invention is not limited to this. The valve body may be a ball valve, a conically shaped valve having a large vertex angle, or the like. In this case also, the cover member may cover the biasing means biasing the valve body.

The embodiments of the present invention have been described above in detail with reference to the drawings. However, specific configurations are not limited to these embodiments, and those with design modifications or the like within a scope not departing from the principal of the present invention are also included in the present invention.

REFERENCE SIGNS LIST 1 main body case
11 primary chamber
12 secondary chamber
14 stopper section (cover means)
17 stopper section (cover means)
2 valve seat section
2A sleeve (cover member)
21 valve port
3 guide section
3A sleeve (cover member)
31 guide hole
4 needle valve (valve body)
41 slide shaft
43 needle section
46 abutment section
5 spring receiver (receiving member)
6 coil spring (biasing means)
L axial line

The invention claimed is:

1. A throttling device provided in between a condenser and an evaporator in a refrigeration cycle for depressurizing a refrigerant in between a primary chamber connected to the condenser and a secondary chamber connected to the evaporator to feed the refrigerant to the evaporator,
said throttling device comprising:
a valve seat in which a valve port for communicating between the primary chamber and the secondary chamber is formed;
a valve body for varying a valve opening degree of the valve port by moving along an axial line of the valve port;
a guide section having a tubular cover for guiding a sliding shaft of the valve body; and
a spring biasing the valve body in a valve closing direction,
wherein the guide section and the spring are arranged in the primary chamber side,
wherein a tubular cover covers the spring, and
wherein a force applied to the valve body is generated by a differential pressure between the primary chamber and the secondary chamber, and
wherein the valve open degree is defined by a balance between the force generated by the differential pressure in a valve open direction and a biasing force of the spring in a valve close direction without a motor or controller acting on the valve and
wherein this valve open degree determines the flow rate of the refrigerant from the primary chamber to the secondary chamber.

2. The throttling device as claimed in claim 1,
further comprising a pressure-equalizing path for communicating an interior of the tubular cover with the primary chamber.

3. A refrigeration cycle comprising:
a compressor for compressing a refrigerant as a fluid;
a condenser;
an evaporator; and
the throttling device connected in between the condenser and the evaporator as claimed in claim 1.

4. A refrigeration cycle comprising:
a compressor for compressing a refrigerant as a fluid;
a condenser;
an evaporator; and
the throttling device connected in between the condenser and the evaporator as claimed in claim 2.

* * * * *